(12) United States Patent
Bech et al.

(10) Patent No.: US 7,895,746 B2
(45) Date of Patent: Mar. 1, 2011

(54) METHOD FOR MANUFACTURING A WIND TURBINE BLADE

(75) Inventors: Anton Bech, Ringkøbing (DK); Poul Valsgaard, Ringkøbing (DK)

(73) Assignee: Vestas Wind Systems A/S (DK)

( * ) Notice: Subject to any disclaimer, the term of this patent is extended or adjusted under 35 U.S.C. 154(b) by 1109 days.

(21) Appl. No.: 11/087,472

(22) Filed: Mar. 23, 2005

(65) Prior Publication Data
US 2006/0188378 A1   Aug. 24, 2006

(30) Foreign Application Priority Data
Feb. 24, 2005   (EP)   ................................. 05004010

(51) Int. Cl.
*B21D 53/78* (2006.01)
*B21K 25/00* (2006.01)
*F03B 3/12* (2006.01)

(52) U.S. Cl. ................. 29/889.7; 29/889.21; 29/889.71; 29/889.72; 416/229 R

(58) Field of Classification Search ... 29/889.2–889.21, 29/889.6–889.61, 889.71–889.722; 416/229 R
See application file for complete search history.

(56) References Cited

U.S. PATENT DOCUMENTS

| | | | | |
|---|---|---|---|---|
| 3,965,963 A | * | 6/1976 | Phipps et al. | ............ 164/122.1 |
| 4,089,456 A | * | 5/1978 | Toppen et al. | ................ 228/195 |
| 4,611,752 A | * | 9/1986 | Jahnke | ........................ 228/194 |
| 5,099,573 A | * | 3/1992 | Krauss et al. | ............. 29/889.72 |
| 5,344,063 A | * | 9/1994 | Johnston et al. | ............. 228/157 |
| 6,530,416 B1 | * | 3/2003 | Tiemann | ...................... 164/137 |
| 7,025,568 B2 | * | 4/2006 | Jones | ........................ 416/90 R |
| 7,223,091 B2 | * | 5/2007 | Olsen et al. | ............... 425/450.1 |
| 7,325,307 B2 | * | 2/2008 | Franchet et al. | ........... 29/889.72 |

FOREIGN PATENT DOCUMENTS

| | | |
|---|---|---|
| DK | 2003 00327 | 9/2004 |
| DK | 175 863 | 4/2005 |
| WO | WO 2004/043679 | 5/2004 |

OTHER PUBLICATIONS

European Search Report; EP 05 00 4010; Jul. 26, 2005.

* cited by examiner

*Primary Examiner*—David P Bryant
*Assistant Examiner*—Alexander P Taousakis
(74) *Attorney, Agent, or Firm*—St. Onge Steward Johnston & Reens LLC

(57) ABSTRACT

The invention relates to a method for manufacturing a wind turbine blade or a section of a wind turbine blade. The method includes, establishing a first part having a first wind turbine blade part in a first fixating unit, establishing a second part having a second wind turbine blade part in a second fixating unit, and positioning the first part in contact with, or in close proximity of, the second part. After this, a pressure below atmospheric pressure is established, forcing the first wind turbine blade part and the second wind turbine blade part against each other.

The invention further relates to a wind turbine blade manufacturing facility, wind turbine blades as well as uses hereof.

25 Claims, 7 Drawing Sheets

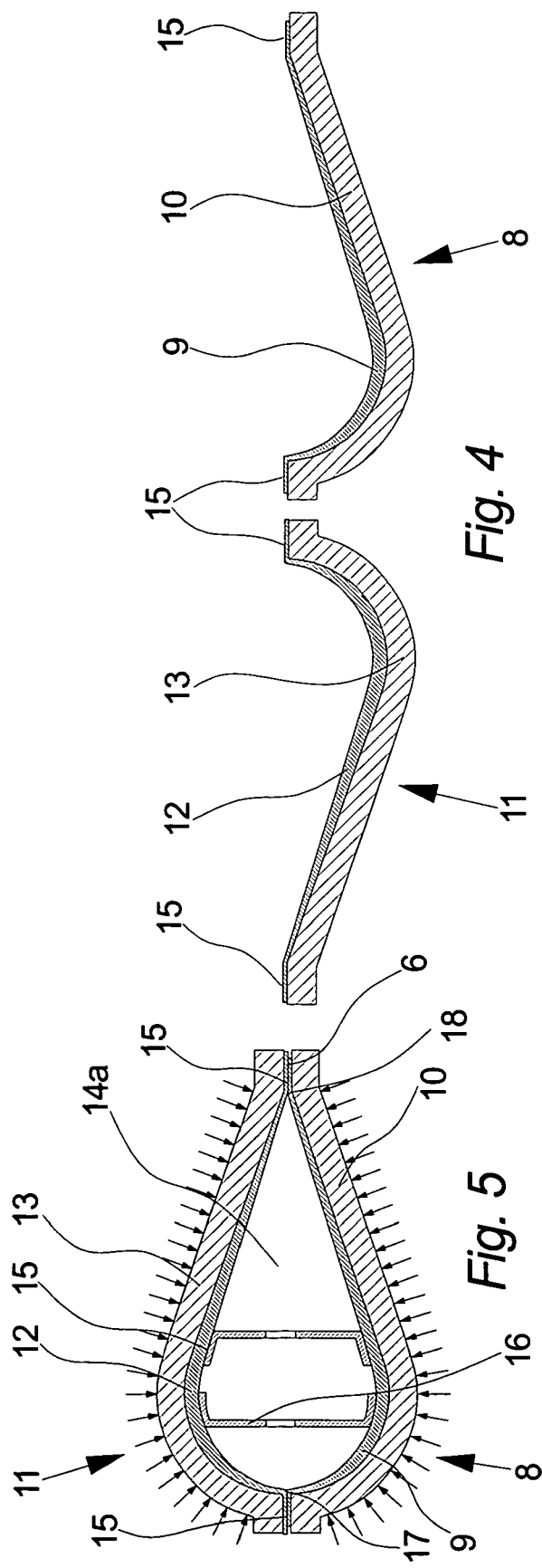

METHOD FOR MANUFACTURING A WIND TURBINE BLADE

BACKGROUND OF THE INVENTION

The invention relates to a wind turbine blade manufacturing facility, a method for manufacturing a wind turbine blade, wind turbine blades and uses hereof.

DESCRIPTION OF RELATED ART

A wind turbine known in the art typically comprises a wind turbine tower and a wind turbine nacelle positioned on top of the tower. A wind turbine rotor, comprising three wind turbine blades, is connected to the nacelle through a low speed shaft, which extends out of the nacelle front as illustrated on FIG. 1.

In resent years the development of mass-produced wind turbines has moved towards making them larger and larger, both in output and in size. This process calls for better and more cost-efficient components and manufacturing methods, and particularly in the field of mass-produced wind turbine blades, this development has been profound, in that the average mass-produced wind turbine blade over the resent years has more than doublet its length.

Wind turbine blades known in the art are typically made of fibre-glass reinforced by metal, wood or carbon fibres. The blades are typically manufactured by moulding two blade halves in two independent moulds. When the blade halves are hardened the connecting surfaces are provided with an adhesive and the halves are placed on top of each other. To ensure that the halves are pressed firmly together while the adhesive is hardening, pressure is applied to the moulds, either by pressing the upper mould down onto the bottom mould by means of pneumatic or hydraulic cylinders or by the use of large clamps or by means of straps surrounding the two moulds or blade halves.

Figure 2A:
Figure 2B:
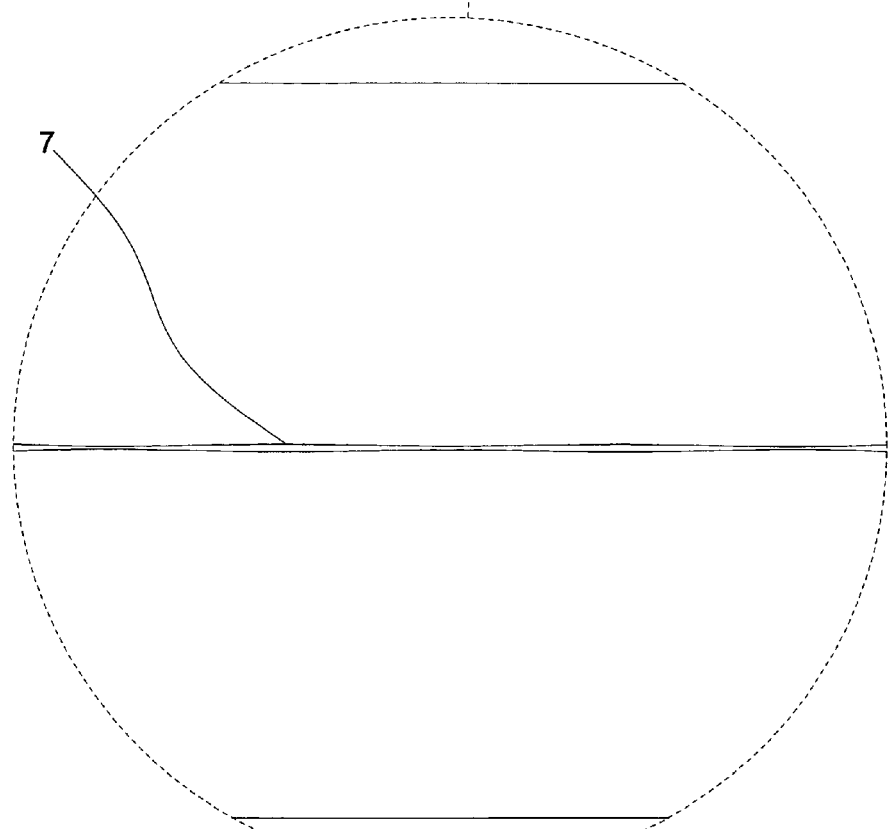

All of these methods have that serious drawback the pressure is only applied in certain points, providing the joints between the two blade halves with a wave like shape as illustrated on FIG. 2B. This wave like shape is unwanted, in that it reduces the blades aerodynamic qualities and the joints are provided with a build-in weakness, in that the joints do not have the same strength throughout the length of the blade.

Furthermore if clamps, straps or the like are used for providing the compressing force, it becomes difficult and time consuming to regulate this force to ensure, that the correct amount of pressure is applied in order to produce a blade with a strong and uniform joint.

An object of the invention is to provide for a wind turbine blade manufacturing facility and a simple and fast wind turbine blade manufacturing method, which ensures that the joints between the two blade halves becomes substantially uniform.

A further object of the invention is to provide for wind turbine blade manufacturing facility and a wind turbine blade manufacturing method, where the compression force on the blade parts can be regulated in a simple and fast manner.

THE INVENTION

The invention provides for a method for manufacturing a wind turbine blade or a section of a wind turbine blade. The method comprises the steps of, establishing at least one first part comprising at least one first wind turbine blade part in at least one first fixating unit, establishing at least one second part comprising at least one second wind turbine blade part in at least one second fixating unit, positioning the at least one first part in contact with, or in close proximity of, the at least one second part, and establishing a pressure below atmospheric pressure, forcing the at least one first wind turbine blade part and the at least one second wind turbine blade part against each other and/or forcing at least one of the wind turbine blade parts against the at least one other.

Hereby it is possible to manufacture a wind turbine blade in a simple and fast manner, which provides the blade with substantially uniform joints.

Using pressure below atmospheric pressure or partial vacuum is advantageous, in that it provide means for pressing the at least two parts against each other by a force running uninterrupted and continuously throughout the entire length of the wind turbine blade parts. Furthermore the compression force can be easily regulated, in that a partial vacuum is easy to adjust by regulating the effect of the means for establishing the pressure below atmospheric pressure.

By the term "forcing . . . against each other" is to be understood, that all the parts are directly or indirectly under influence of the partial vacuum, and that this influence is pressing the individual parts against the other parts.

By the term "forcing at least one . . . against the at least one other" is to be understood, that at least one of the parts are directly or indirectly under influence of the partial vacuum, and that this influence is pressing this at least one part against the other part or parts.

An aspect of the invention provides for a method for manufacturing a wind turbine blade or a section of a wind turbine blade, wherein said method involve the step of positioning one or more strengthening members on said at least one first wind turbine blade part and/or on said at least one second wind turbine blade part.

It is advantageous to provide the wind turbine blade with a strengthening member in form of e.g. a beam, a web or a latticework, in that one or more members connecting the first wind turbine blade part and the second wind turbine blade part transversely, provides for a very weight efficient way of strengthening the blade. Furthermore the one or more strengthening members may help the blade maintaining its shape.

Generally it can be said, that the more complicated the wind turbine blades structure is e.g. in form of a many and/or complicated strengthening members, the more advantageous it is, that the compression force can be distributed evenly and that it can be regulated easily.

An aspect of the invention provides for a method for manufacturing a wind turbine blade or a section of a wind turbine blade, wherein said at least one first wind turbine blade part, said at least one second wind turbine blade part and one or more strengthening members comprise corresponding contact surfaces.

It is advantageous to provide the at least one first wind turbine blade part, the at least one second wind turbine blade part and the one or more strengthening members with corresponding contact surfaces, in that it provides the parts with surfaces suitable for attaching the parts to each other.

An aspect of the invention provides for a method for manufacturing a wind turbine blade or a section of a wind turbine blade, wherein said contact surfaces extents along one or more of the following: leading edge, trailing edge, tip edge and the root.

An aspect of the invention provides for a method for manufacturing a wind turbine blade or a section of a wind turbine blade, wherein said method involve the step of applying adhesive means to all or some of said contact surfaces before positioning said at least one first part in close proximity of said at least one second part.

It is advantageous to provide the contact surfaces with adhesive means such as natural or artificial resin before the parts are put together, in that the adhesive can be distributed more evenly and controlled on a free and exposed surface.

An aspect of the invention provides for a method for manufacturing a wind turbine blade or a section of a wind turbine blade, wherein said pressure below atmospheric pressure is established in at least one cavity formed by said at least one first part and said at least one second part.

Establishing the partial vacuum in a cavity formed by the first part and the second part is advantageous, in that the partial vacuum can be established in or close to the blade parts which the partial vacuum is to force together. Furthermore it enables the compressing forces, produced by the partial vacuum, to run continuously and uninterrupted throughout the longitudinal extent of wind turbine blade parts.

By the term "cavity" is to be understood an opening or a hollow space. The cavity does not necessarily have to be closed at all sides or ends, which means that the word cavity also includes gaps, notches, channels, grooves and ducts.

An aspect of the invention provides for a method for manufacturing a wind turbine blade or a section of a wind turbine blade, wherein said at least one cavity is formed completely or partially by said at least one first fixating unit and said at least one second fixating unit.

It is advantageous to form the cavity, in which the partial vacuum is to be established, by the fixating units in that it provides for a well-defined cavity.

An aspect of the invention provides for a method for manufacturing a wind turbine blade or a section of a wind turbine blade, wherein said at least one cavity is at least two separate cavities e.g. extending along at least one joint by the leading edge and along at least one joint by the trailing edge of said wind turbine blade parts.

Placing a cavity on each side of the blade parts is advantageous, in that it provides for a simple way of distributing the partial vacuum, so that the compressing forces are applied close to where they are needed, namely by the contact surfaces.

An aspect of the invention provides for a method for manufacturing a wind turbine blade or a section of a wind turbine blade, wherein said at least one cavity extents substantially throughout the longitudinal extent of said wind turbine blade parts.

Making the cavity extent throughout the entire length of the blade parts is advantageous, in that enables the compressing forces, produced by the partial vacuum, to affect the blade parts throughout the entire length of the wind turbine blade parts.

An aspect of the invention provides for a method for manufacturing a wind turbine blade or a section of a wind turbine blade, wherein said method involve the step of sealing said at least one cavity before said pressure below atmospheric pressure is established.

If the at least one cavity is formed as e.g. a slit, it is advantageous to seal it, to create a closed space in which a partial vacuum can be established.

An aspect of the invention provides for a method for manufacturing a wind turbine blade or a section of a wind turbine blade, wherein said sealing involves providing said at least one cavity with one or more sealing means.

An aspect of the invention provides for a method for manufacturing a wind turbine blade or a section of a wind turbine blade, wherein said sealing involves plugging at least one end of said at least one cavity and connecting at least one vacuum pump directly or indirectly to said at least one other end of said at least one cavity.

If the at least one cavity is formed as e.g. a duct, it is advantageous to seal one end of this duct by providing the end of the duct with a plug, and using the other end for connecting a partial vacuum establishing mean such as e.g. a vacuum pump, a vacuum injection pump or a tank in which vacuum is stored.

An aspect of the invention provides for a method for manufacturing a wind turbine blade or a section of a wind turbine blade, wherein said cavities has an extent of between 10 mm to 1000 mm, preferably 50 mm to 500 mm and most preferred between 100 mm to 350 mm in a direction perpendicular to the longitudinal extent of said wind turbine blade parts and parallel to a line through said leading edge and said trailing edge of said wind turbine blade parts.

An advantageous relation between size and function of the fixating units is achieved, by making the cavities of the ranged width.

An aspect of the invention provides for a method for manufacturing a wind turbine blade or a section of a wind turbine blade, wherein said establishing of said pressure below atmospheric pressure results in a partial vacuum inside said at least one cavity of between 0.1 Bar to 0.95 Bar, preferably between 0.3 Bar to 0.9 Bar and most preferred between 0.6 Bar to 0.85 Bar, where 0 Bar is absolute vacuum and 1 Bar is proximately atmospheric pressure.

The higher degree of vacuum that needs to be provided to achieve a certain compressing force on the wind turbine blade parts, the more energy it takes and the more time it takes. The present pressure range provides for an advantageous relation between time/energy and function.

An aspect of the invention provides for a method for manufacturing a wind turbine blade or a section of a wind turbine blade, wherein said a pressure below atmospheric pressure inside said at least one cavity results in a compressing force on the surface of said at least one wind turbine blade parts of between 1.000 N to 10.000.000 N, preferably between 10.000 N to 3.000.000 N and most preferred between 100.000 N to 1.000.000 N.

Experience has taught that it is advantageous to provide a wind turbine blade with a pressure within the present ranges e.g. during hardening of an adhesive connecting the wind turbine blade parts.

An aspect of the invention provides for a method for manufacturing a wind turbine blade or a section of a wind turbine blade, wherein said at least one cavity is formed by the parts of said at least one first fixating unit and said at least one second fixating unit surrounding said at least one first wind turbine blade part and said at least one second wind turbine blade part.

It is advantageous to use the cavity in the fixating units, in which the wind turbine blade parts are placed for establishing a partial vacuum, in that no extra cavities need to be established. Furthermore a partial vacuum in this cavity enables a compressing force distributed over the entire surface of the wind turbine blade parts, which is advantageous if e.g. a compressing force is needed by e.g. a beam in the middle of the blade parts.

An aspect of the invention provides for a method for manufacturing a wind turbine blade or a section of a wind turbine blade, wherein said at least one first fixating unit and said at least one second fixating unit further forms at least two separate cavities e.g. extending along an at least one joint by the leading edge and along an at least one joint by the trailing edge of said wind turbine blade parts.

It is advantageous to provide the fixating units with further cavities in that it enables the possibility of even more targeted compressing forces.

An aspect of the invention provides for a method for manufacturing a wind turbine blade or a section of a wind turbine blade, wherein said establishing of said pressure below atmospheric pressure results in a partial vacuum inside said at least one cavity of between 0.1 Bar to 0.995 Bar, preferably between 0.5 Bar to 0.99 Bar and most preferred between 0.8 Bar to 0.98 Bar, where 0 Bar is absolute vacuum and 1 Bar is proximately atmospheric pressure.

An aspect of the invention provides for a method for manufacturing a wind turbine blade or a section of a wind turbine blade, wherein said a pressure below atmospheric pressure inside said at least one cavity results in a compressing force on the surface of said at least one wind turbine blade parts of between 1.000 N to 10.000.000 N, preferably between 10.000 N to 3.000.000 N and most preferred between 100.000 N to 1.000.000 N.

An aspect of the invention provides for a method for manufacturing a wind turbine blade or a section of a wind turbine blade, wherein said at least one cavity is formed by said at least one first wind turbine blade part and said at least one second wind turbine blade part.

It is advantageous to use the at least one cavity inside the wind turbine blade parts for establishing a partial vacuum, in that wind turbine blades known in the art, are hollow and substantially airtight or easily sealable, whereby no further cavities in the fixating units or other are needed.

An aspect of the invention provides for a method for manufacturing a wind turbine blade or a section of a wind turbine blade, wherein said at least one cavity extents substantially throughout the entire length of said at least one wind turbine blade parts.

An aspect of the invention provides for a method for manufacturing a wind turbine blade or a section of a wind turbine blade, wherein said at least one cavity is positioned in, or in close proximity of, said contact surfaces.

Establishing partial vacuum inside e.g. one or more grooves embedded in the contact surfaces is advantageous, in that the compression force provided by the partial vacuum is much targeted, ensuring that no other parts of the blades or the fixating units are affected by the compressing force and thereby preventing possible damage to these part produced by said force.

An aspect of the invention provides for a method for manufacturing a wind turbine blade or a section of a wind turbine blade, wherein said pressure below atmospheric pressure provides a compressing force that runs uninterrupted throughout the longitudinal extent of said wind turbine blade parts.

By letting the compressing force run uninterrupted throughout the longitudinal extent of the wind turbine blade parts the wave like shape of the joint between the blade parts is avoided, in that the compressing force is not applied in certain points only.

An aspect of the invention provides for a method for manufacturing a wind turbine blade or a section of a wind turbine blade, wherein said compressing force further is uniform throughout the longitudinal extent of wind turbine blade parts.

Making the compressing force uniform throughout the longitudinal extent of the lade parts is advantageous, in that by applying the same compressing force everywhere the joint should theoretically be uniform everywhere.

An aspect of the invention provides for a method for manufacturing a wind turbine blade or a section of a wind turbine blade, wherein said method involve the step of moulding said at least one first wind turbine blade part and said at least one second wind turbine blade part around at least one fixating edge on said at least one first fixating unit and said at least one second fixating unit.

Moulding the blade parts around at least one fixating edge is advantageous, in that it fixates the edges of the blade parts and thereby maintains the contact surfaces position constant, simplifying both the process of adding adhesive and the process of establishing partial vacuum.

An aspect of the invention provides for a method for manufacturing a wind turbine blade or a section of a wind turbine blade, wherein said at least one fixating edge on said at least one first fixating unit or on said at least one second fixating unit is made in an acute angle and said at least one other fixating edge on said at least one first fixating unit or on said at least one second fixating unit is made substantially rectangular.

Making at least one fixating edge in an acute angle is advantageous, in that it helps to maintain a blade parts position in the fixating unit, particularly during the handling process, if said blade part is an upper part to be positioned onto of a corresponding bottom part. Making at least one other fixating edge rectangular is advantageous, if this edge is a part of a fixating unit containing a bottom blade part, in that it enables unresisting removal of the complete blade or section of a blade.

An aspect of the invention provides for a method for manufacturing a wind turbine blade or a section of a wind turbine blade, wherein at least one of said at least one first fixating unit and said at least one second fixating unit is a mould, in which said at least one first and second wind turbine blade parts are moulded.

It is advantageous to use moulds as the fixating units, in that it simplifies the manufacturing process by reducing handling.

The invention further provides for a wind turbine blade manufacturing facility, comprising at least one first part including at least one first fixating unit, adapted for fixating at least one first wind turbine blade part, at least one second part comprising at least one second fixating unit, adapted for fixating at least one second wind turbine blade part, and means for positioning said at least one first part in contact with or in close proximity of said at least one second part. The manufacturing facility is characterized in that, it further comprise means for establishing a pressure below atmospheric pressure, forcing said at least one first wind turbine blade part and said at least one second wind turbine blade part against each other and/or forcing at least one of the wind turbine blade parts against the at least one other.

Hereby is achieved an advantageous apparatus according to the invention.

Using means such as a vacuum pump, for evacuating air to establish a pressure below atmospheric pressure, is advantageous in that, it is easy to regulate the effect of e.g. a vacuum pump and thereby it is easy to regulate the force pressing the blade parts together.

It should be emphasised that the term "wind turbine blade manufacturing facility" also includes facilities to manufacture sections of a wind turbine blade.

In an aspect of the invention, said facility comprise means for positioning one or more strengthening members on said at least one first wind turbine blade part and/or on said at least one second wind turbine blade part.

If the wind turbine blade is to be provided with one or more strengthening members, it is advantageous to equip the facility with means for handling these members.

In an aspect of the invention, said at least one first wind turbine blade part, said at least one second wind turbine blade part and one or more strengthening members comprise corresponding contact surfaces.

In an aspect of the invention, said contact surfaces extents along one or more of the following: leading edge, trailing edge, tip edge and the root.

In an aspect of the invention, said facility comprise means for applying an adhesive to all or some of said contact surfaces.

If the contact surfaces are to be provided with an adhesive, it is advantageous to equip the facility with means for applying this adhesive.

In an aspect of the invention, said at least one first part and said at least one second part forms at least one cavity when positioned in contact with or in close proximity of each other.

In an aspect of the invention, said at least one first fixating unit and said at least one second fixating unit completely or partially forms at least one cavity when positioned in contact with or in close proximity of each other.

In an aspect of the invention, said at least one cavity extents substantially throughout the longitudinal extent of said wind turbine blade parts.

In an aspect of the invention, said at least one cavity is at least two separate cavities e.g. extending along at least one joint by the leading edge and along at least one joint by the trailing edge of said wind turbine blade parts.

In an aspect of the invention, said facility comprise means for sealing said at least one cavity.

In an aspect of the invention, said means for sealing comprise one or more plugs for plugging at least one end of said at least one cavity and at least one vacuum pump for connecting to said at least one other end of said at least one cavity.

In an aspect of the invention, said cavities has an extent of between 10 mm to 1000 mm, preferably 50 mm to 500 mm and most preferred between 100 mm to 350 mm in a direction perpendicular to the longitudinal extent of said wind turbine blade parts and parallel to a line through said leading edge and said trailing edge of said wind turbine blade parts.

In an aspect of the invention, said means for establishing a pressure below atmospheric pressure are capable of producing a partial vacuum, inside said at least one cavity, of between 0.1 Bar to 0.95 Bar, preferably between 0.3 Bar to 0.9 Bar and most preferred between 0.6 Bar to 0.85 Bar, where 0 Bar is absolute vacuum and 1 Bar is proximately atmospheric pressure.

In an aspect of the invention, said facility comprise means for establishing a pressure below atmospheric pressure inside said at least one cavity which results in a compressing force on the surface of said at least one wind turbine parts of between 1.000 N to 10.000.000 N, preferably between 10.000 N to 3.000.000 N and most preferred between 100.000 N to 1.000.000 N.

In an aspect of the invention, said at least one cavity is formed by the parts of said at least one first fixating unit and said at least one second fixating unit surrounding said at least one first wind turbine blade part and said at least one second wind turbine blade part.

In an aspect of the invention, said at least one first fixating unit and said at least one second fixating unit further forms at least two separate cavities e.g. extending along an at least one joint by the leading edge and along an at least one joint by the trailing edge of said wind turbine blade parts.

In an aspect of the invention, said means for establishing a pressure below atmospheric pressure are capable of producing a partial vacuum, inside said at least one cavity, of between 0.1 Bar to 0.995 Bar, preferably between 0.5 Bar to 0.99 Bar and most preferred between 0.8 Bar to 0.98 Bar, where 0 Bar is absolute vacuum and 1 Bar is proximately atmospheric pressure.

In an aspect of the invention, said facility comprise means for establishing a pressure below atmospheric pressure inside said at least one cavity which results in a compressing force on the surface of said at least one wind turbine parts of between 1.000 N to 10.000.000 N, preferably between 10.000 N to 3.000.000 N and most preferred between 100.000 N to 1.000.000 N.

In an aspect of the invention, said at least one cavity is formed by said at least one first wind turbine blade part and said at least one second wind turbine blade part.

In an aspect of the invention, said at least one cavity extents substantially throughout the entire length of said at least one wind turbine blade parts.

In an aspect of the invention, said at least one cavity is positioned in, or in close proximity of, said contact surfaces.

In an aspect of the invention, said means for providing a pressure below atmospheric pressure provides a compressing force that runs uninterrupted throughout the longitudinal extent of said wind turbine blade parts.

In an aspect of the invention, said compressing force further is uniform throughout the longitudinal extent of said wind turbine blade parts.

In an aspect of the invention, said at least one first fixating unit and said at least one second fixating unit is provided with at least one fixating edge for moulding at least one edge of said at least one first wind turbine blade part and said at least one second wind turbine blade part around.

In an aspect of the invention, said at least one fixating edge on said at least one first fixating unit or on said at least one second fixating unit is made in an acute angle and said at least one other fixating edge on said at least one first fixating unit or on said at least one second fixating unit is made substantially rectangular.

In an aspect of the invention, at least one of said at least one first fixating unit and said at least one second fixating unit is a mould, in which said at least one first and second wind turbine blade parts are moulded.

The invention further provides for use of a method for manufacturing a wind turbine blade, where said wind turbine blade is made of carbon fibre reinforced wood, a glass fibre and resin composite or any other material suitable for making large wind turbine blades.

The invention further provides for use of a wind turbine blade manufacturing facility, where said wind turbine blade is made of carbon fibre reinforced wood, a glass fibre and resin composite or any other material suitable for making large wind turbine blades.

FIGURES

Figure 1:
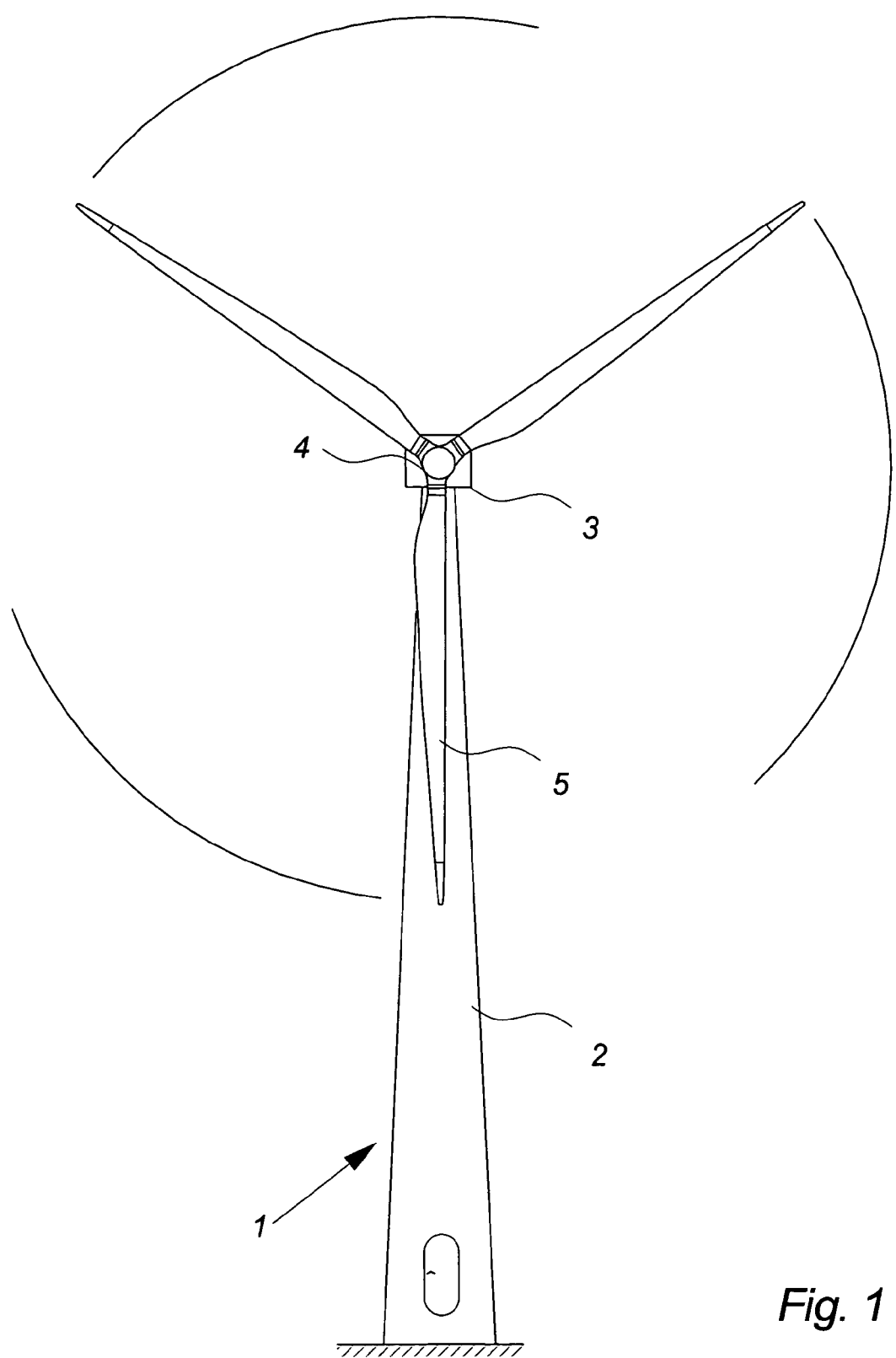
Figure 3:
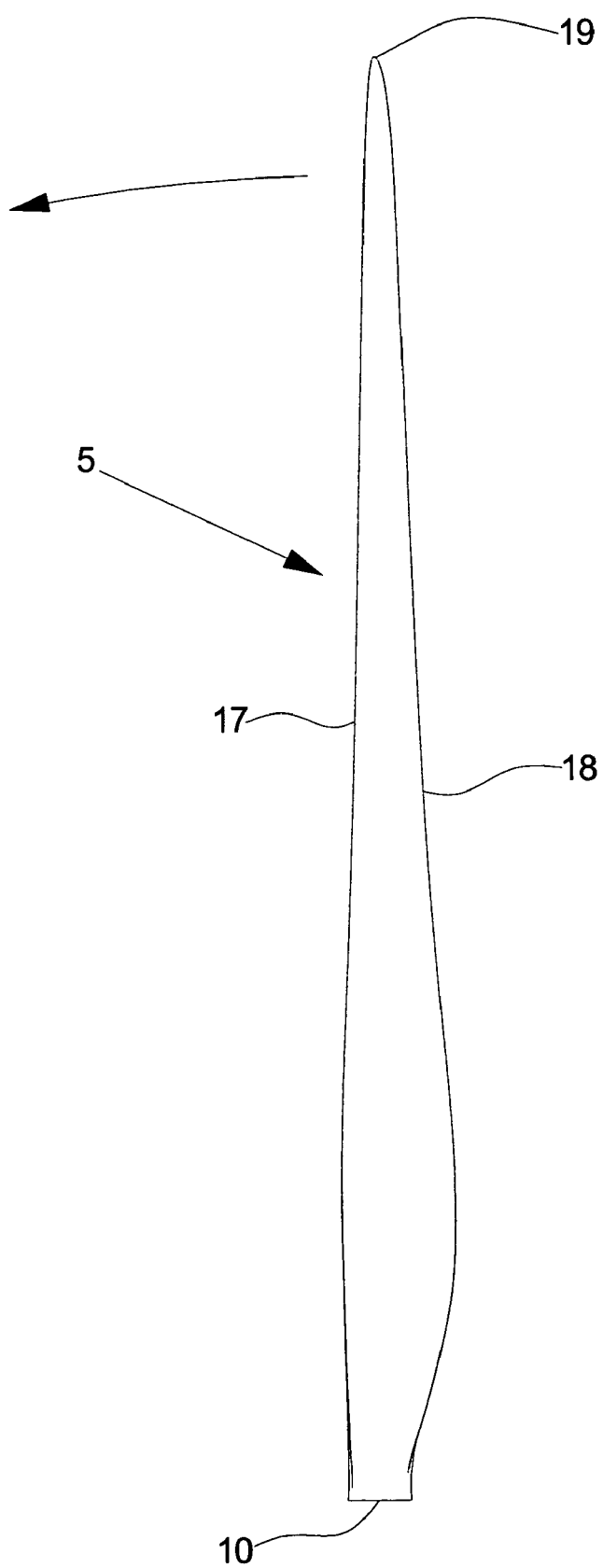
Figure 6:
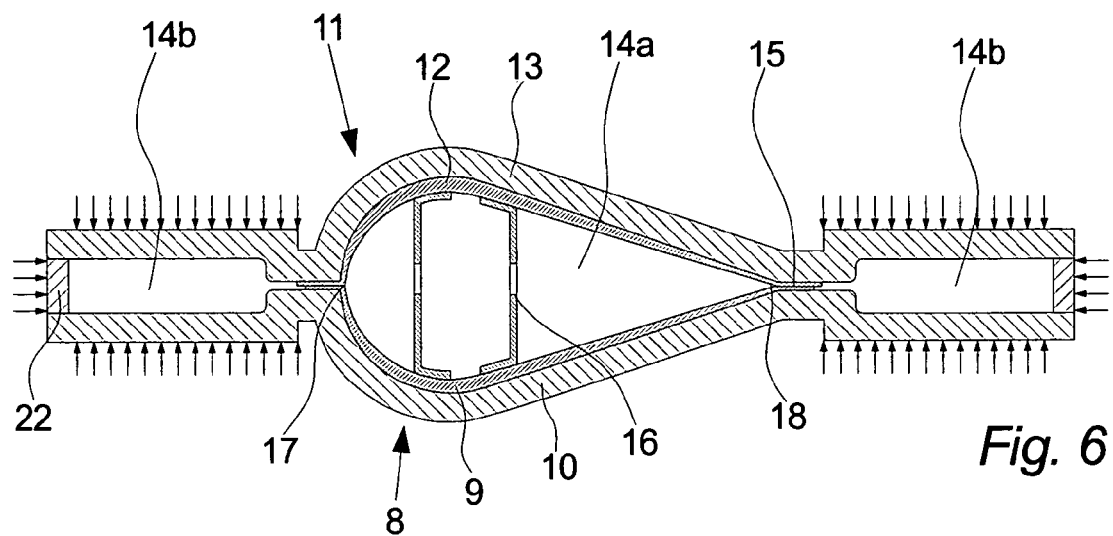
Figure 7:
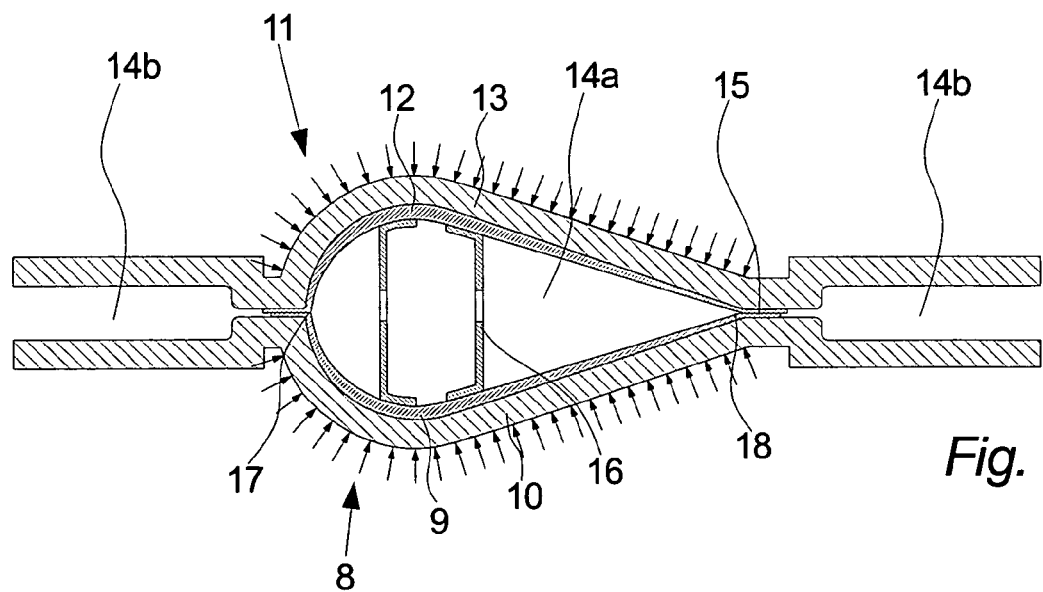
Figure 8:
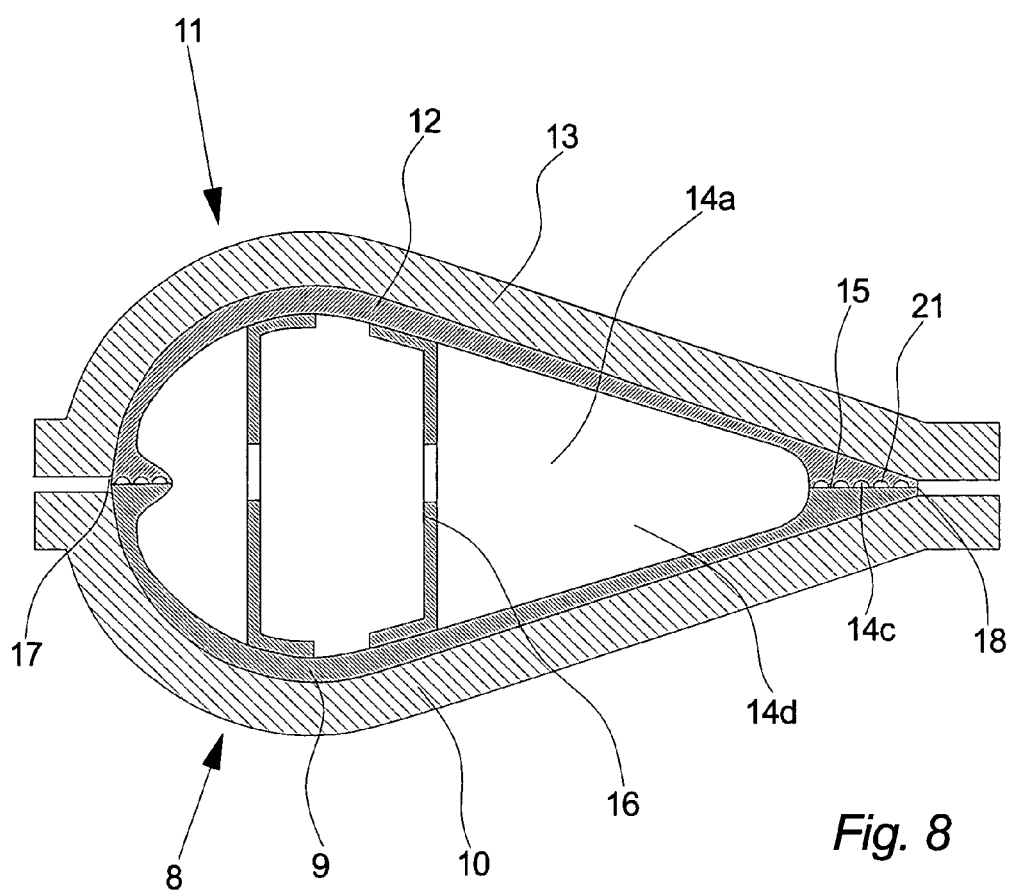
Figure 9:
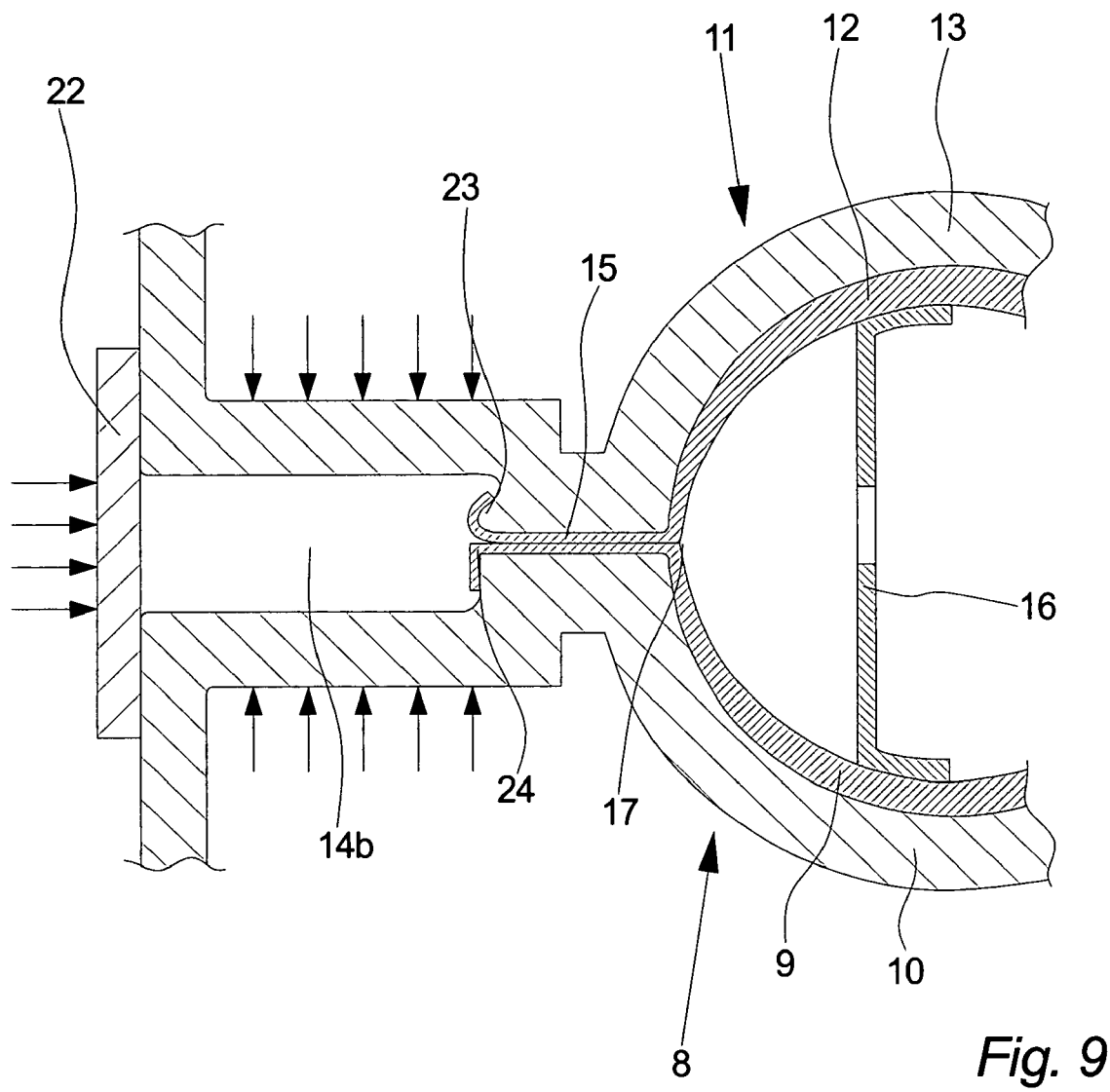

The invention will be described in the following with reference to the figures in which FIG. 1. illustrates a large modern wind turbine, FIG. 2A illustrates a wind turbine blade, as seen from the side, FIG. 2B illustrates a section of a wind turbine blade, as seen from the side, FIG. 3 illustrates a wind turbine blade, as seen from the front, FIG. 4 illustrates a vertical cross section of a first part and a second part placed beside each other, as seen from the root of the blade, FIG. 5 illustrates a vertical cross section of a first part and a second part placed on top of each other, as seen from the root of the blade, FIG. 6 illustrates a vertical cross section of a first part and a second part comprising additional cavities, as seen from the root of the blade, FIG. 7 illustrates a vertical cross section of a first part and a second part, as seen from the root of the blade, FIG. 8 illustrates a vertical cross section of a first part and a second part comprising grooves embedded in some of the contact surfaces, as seen from the root of the blade, and FIG. 9 illustrates a vertical cross section of a first part and a second part comprising fixating edges, as seen from the root of the blade.

DETAILED DESCRIPTION

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

FIG. 2A illustrates a wind turbine blade 5 as seen from the side. As illustrated a wind turbine blade 5 known in the art is made of two substantially identical blade halves connected in a joint 6 by means of adhesive. To keep the two blade halves pressed firmly together while the adhesive is hardening the known method is to apply pressure to the blade halves, either by means of straps tightened around the halves, by means of hydraulic or pneumatic actuators or other methods applying pressure in a number of specific points.

FIG. 2B illustrates a section of the same wind turbine blade 5 as illustrated in FIG. 2A, where the wave like shape of the joint 7 is clearly shown.

When manufacturing wind turbine blades 5 by use of traditional manufacturing methods, pressure is not applied uniformly, constantly or uninterrupted. This results in a joint between the two blade halves with a wave like shape 7.

FIG. 3 illustrates a wind turbine blade, as seen from the front. The wind turbine blade comprises a leading edge 17, a trailing edge 18, a tip edge 19 and a root 20. The blade is typically hollow, except for one or more strengthening members 16 extending substantially the entire length of the blade 5 or part of the blades 5 length. A wind turbine blade 5 known in the art is typically made of a glass fibre and resin composite reinforced by carbon fibre, carbon fibre reinforced wood or a combination hereof.

FIG. 4 illustrates a vertical cross section a first part 8 and a second part 11. The first part 8 comprises a first wind turbine blade part 9 placed in a first fixating unit 10, which in this case is the mould in which the blade part 9 is made. Likewise the second part 11 comprises a second wind turbine blade part 12 placed in a second fixating unit 13, which also is the mould in which the blade part 12 is moulded.

In this embodiment of the invention, the two substantially symmetrical parts 8, 11 are placed beside each other with the outer surfaces of the blade parts 9, 12 facing down, during the moulding of the blade parts 9, 12. When the blade parts 9, 12 has hardened, the contact surfaces 15 are provided with an adhesive, and the second part 11 is rotated and positioned on top of the first part 8, e.g. by means of some sort of a crane (like a gantry crane) or special-build rotating and positioning equipment. The adhesive could also be provided to the contact surfaces after the blade parts 9, 12 are brought in contact with each other or in close proximity of each other.

In this embodiment of the invention the second part 11 is placed on top of the first part 8, but in another embodiment of the invention the first part 8 could be placed on top of the second part 11, or the two parts 8, 11 could be placed against each other in e.g. a vertical position.

In this embodiment of the invention the parts 8, 11 are for moulding an entire wind turbine blade 5, but since wind turbines 1 are getting bigger and bigger, the wind turbine blades 5 are gradually getting to long to be transported in one piece. The blade 5 would then be manufactured as sections, which then are to be assembled at the wind turbine mounting site. In another embodiment of the invention the parts 8, 11 and the entire manufacturing facility could therefore be for manufacturing sections of wind turbine blades 5.

FIG. 5. illustrates the second part 11 placed on top of the first part 8 making the two parts 8, 11 abut at the contact surfaces 15 on the blade parts 9, 12. Before the second part 11 is placed on top of the first part 8, two strengthening members 16 are attached to the first blade part 9 e.g. by means of adhesive. When the second blade part 12 are placed on top of the first 9, and the strengthening members 16 are attached to the second blade part 12, the strengthening members 16 constitutes cross braces making the blade 5 more rigid and helping the blade maintain its shape.

In another embodiment of the invention the blade 5 could be provided with more than two juxtaposed strengthening members 16 e.g. three, four or six members, and all or some of the members 16 could be placed inside the blade 5 after the two parts 8, 11 are placed on top of each other, or the wind turbine blade parts 9, 12 could be made so strong that no strengthening members 16 are needed.

In another embodiment of the invention the blade 5 could also be provided with only one strengthening member 16 e.g. in form of a beam. This beam could be the member carrying the entire blade 5, and the blade parts 9, 12 could then just be relatively thin shells, mainly provided for giving the blade its aerodynamic shape.

In this embodiment of the invention the two mould parts 10, 13 forms a cavity 14a which is substantially closed all the way around, except at the root of the blade 5, where means for evacuating air, such as a vacuum pump, can be attached to the mould parts 10, 13. When a partial vacuum is established inside the cavity 14a, the air outside the two mould parts 10, 13 will press against the mould parts 10, 13.

These mould parts 10, 13 will then press against the entire outer surface of the blade parts 9, 12 and particularly against the contact surfaces 15 both at the joint 6 by the leading edge 17 and the trailing edge 18, but also by the strengthening members 16 contact surfaces 15.

Since the wind turbine blade 5 is not uniform throughout the entire length of the blade 5, the compression force produced by the partial vacuum is not uniform either, since the magnitude of the pressure is defined by the size of the vacuum, multiplied by the projected area it affects. But even though the load is not uniform, it still runs uninterrupted throughout the entire length of the blade 5 and the variation in compression force is relatively small and distributed over relatively large distances.

FIG. 6 illustrates a vertical cross section of a first part 8 and a second part 11 as seen from the root 20 of the blade. In this embodiment of the invention the fixating units 10, 13, which in this case are the moulds in which the blade parts 9, 12 are made, forms a part of two additional cavities 14b running along the joints 6, at the leading edge 17 and the trailing edge 18 in the entire length of the blade 5. Sealing means 22, such as a plate or a stiff tarpaulin, is provided to these cavities 14b to seal the sides, a plug is provided to seal the one end of the cavity 14b and partial vacuum providing means are attached to the other ends. In another embodiment of the invention the two additional cavities 14b could be joined in one end, so that only one opening needs to be plugged, this opening being positioned next to the opening, where the pump means are to be attached e.g. in the root 20 end of the blade 5.

In another embodiment of the invention, the fixating units 10, 13 could be made in a way that, except for the opening for attaching e.g. a vacuum pump, the cavities 14b would be completely sealed, when the two parts 8, 11 are brought in contact with each other.

When air is evacuated from the cavities 14b the two fixating units 10, 13 will press against each other and produce the needed compressing force, during the hardening of the adhesive provided to the contact surfaces 15.

In this embodiment of the invention the cavities 14b are substantially uniform throughout the entire length of the blade 5, producing a substantially uniform and uninterrupted compressing force throughout the entire length of the blade 5, but in another embodiment the projected area of the cavities 14b could vary throughout the length of the blade 5, to produce a varying load adapted to the specific need.

FIG. 7 illustrates a vertical cross section of a similar embodiment of the invention as illustrated in FIG. 6, as seen from the root 20 of the blade. Even though the fixating units 10, 13 forms a part of two additional cavities 14b the partial vacuum is established inside the part of the two fixating units 10, 13 surrounding the blade parts 9, 12. In another embodiment of the invention the partial vacuum could be established in both the part of the two fixating units 10, 13 surrounding the blade parts 9, 12 and in the additional cavities 14b.

FIG. 8 illustrates a vertical cross section of a first part 8 and a second part 11, comprising grooves 21 embedded in the second wind turbine blade parts 12 contact surfaces 15, as seen from the root 20 of the blade 5. In this embodiment of the invention the partial vacuum is established inside these grooves 21, providing the compression force exactly where it is needed and independent of fixating units 10, 13 or the design thereof.

In another embodiment of the invention the partial vacuum could be established inside the entire cavity 14d formed by the first wind turbine blade part 9 and the second wind turbine blade part 9.

FIG. 9 illustrates a section of a vertical cross section of a first part 8 and a second part 11 comprising fixating edges 23, 24, as seen from the root 20 of the blade 5. To ensure that the contact surfaces 15 maintain their positions during the hardening of the blade parts 9, 12 and the succeeding handling the edges of the blade parts 9, 12 are moulded around fixating edges 23, 24 on the fixating units 10, 13.

The second wind turbine blade part 12 is moulded around an acute angled fixating edge 23 on the second fixating unit 13 to help fixate the blade part 12 during a rotation and positioning on top of the first part 8. The first wind turbine blade part 9 is moulded around a rectangular fixating edge 24 on the first fixating unit 10, in that a rectangular fixating edge 24 makes it easier to remove the blade 5 from the fixating unit 10. The excess material can be cut of during the process of giving the blade 5 its final finish.

In another embodiment of the invention both fixating edges 23, 24 could be made in an acute angle or both could be rectangular.

The invention has been exemplified above with reference to specific examples of wind turbine blades 5 and wind turbine blade manufacturing facilities. However, it should be understood that the invention is not limited to the particular examples described above but may be designed and altered in a multitude of varieties within the scope of the invention as specified in the claims.

The invention claimed is:

1. Method for manufacturing a wind turbine blade or a section of a wind turbine blade, said method comprising:
    establishing at least one first part comprising at least one first wind turbine blade part in at least one first fixating unit;
    establishing at least one second part comprising at least one second wind turbine blade part in at least one second fixating unit;
    positioning said at least one first part in contact with, or in close proximity of, said at least one second part to form at least one sealed cavity; and
    reducing pressure in said at least one sealed cavity below atmospheric pressure, while maintaining atmospheric pressure on the outside of said at least one first and at least one second wind turbine parts, by displacing the air out of said at least one sealed cavity, thus forcing said at least one first wind turbine blade part and said at least one second wind turbine blade part against each other thereby adhering the two wind turbine parts together.

2. Method for manufacturing a wind turbine blade or a section of a wind turbine blade according to claim 1, wherein said method further comprises positioning one or more strengthening members on said at least one first wind turbine blade part and/or on said at least one second wind turbine blade part.

3. Method for manufacturing a wind turbine blade or a section of a wind turbine blade according to claim 2, wherein said at least one first wind turbine blade part, said at least one second wind turbine blade part and one or more strengthening members comprise corresponding contact surfaces.

4. Method for manufacturing a wind turbine blade or a section of a wind turbine blade according to claim 3, wherein said contact surfaces extend along one or more of the following: leading edge, trailing edge, tip edge and the root.

5. Method for manufacturing a wind turbine blade or a section of a wind turbine blade according to claim 3, wherein said method further comprises applying adhesive means to all or some of said contact surfaces before positioning said at least one first part in close proximity of said at least one second part.

6. Method for manufacturing a wind turbine blade or a section of a wind turbine blade according to claim 1, wherein said at least one cavity is formed completely or partially by said at least one first fixating unit and said at least one second fixating unit.

7. Method for manufacturing a wind turbine blade or a section of a wind turbine blade according to claim 6, wherein said at least one cavity comprises at least two separate cavities extending along at least one joint by the leading edge and along at least one joint by the trailing edge of said wind turbine blade parts.

8. Method for manufacturing a wind turbine blade or a section of a wind turbine blade according to claim 7, wherein said at least one cavity extends substantially throughout the longitudinal extent of said wind turbine blade parts.

9. Method for manufacturing a wind turbine blade or a section of a wind turbine blade according to claim 1, wherein said sealing comprises providing said at least one cavity with one or more sealing means.

10. Method for manufacturing a wind turbine blade or a section of a wind turbine blade according to claim 1, wherein said sealing comprises plugging at least one end of said at least one cavity and connecting at least one vacuum pump directly or indirectly to said at least one other end of said at least one cavity.

11. Method for manufacturing a wind turbine blade or a section of a wind turbine blade according to claim 7, wherein said cavities has an extent of between 10 mm to 1000 mm, in a direction perpendicular to the longitudinal extent of said wind turbine blade parts and parallel to a line through said leading edge and said trailing edge of said wind turbine blade parts.

12. Method for manufacturing a wind turbine blade or a section of a wind turbine blade according to claim 7, wherein said reducing of said pressure below atmospheric pressure results in a partial vacuum inside said at least one cavity of between 0.1 Bar to 0.95 Bar, where 0 Bar is absolute vacuum and 1 Bar is proximately atmospheric pressure.

13. Method for manufacturing a wind turbine blade or a section of a wind turbine blade according to claim 7, wherein said a pressure below atmospheric pressure inside said at least one cavity results in a compressing force on the surface of said at least one wind turbine blade parts of between 1,000 N to 10,000,000 N.

14. Method for manufacturing a wind turbine blade or a section of a wind turbine blade according to claim 6, wherein said at least one cavity is formed by the parts of said at least one first fixating unit and said at least one second fixating unit surrounding said at least one first wind turbine blade part and said at least one second wind turbine blade part.

15. Method for manufacturing a wind turbine blade or a section of a wind turbine blade according to claim 14, wherein said at least one first fixating unit and said at least one second fixating unit further forms at least two separate cavities extending along an at least one joint by the leading edge and along an at least one joint by the trailing edge of said wind turbine blade parts.

16. Method for manufacturing a wind turbine blade or a section of a wind turbine blade according to claim 14, wherein said reducing of said pressure below atmospheric pressure results in a partial vacuum inside said at least one cavity of between 0.1 Bar to 0.995 Bar, where 0 Bar is absolute vacuum and 1 Bar is proximately atmospheric pressure.

17. Method for manufacturing a wind turbine blade or a section of a wind turbine blade according to claim 14, wherein said a pressure below atmospheric pressure inside said at least one cavity results in a compressing force on the surface of said at least one wind turbine blade parts of between 1,000 N to 10,000,000 N.

18. Method for manufacturing a wind turbine blade or a section of a wind turbine blade according to claim 1, wherein said at least one cavity extends substantially throughout the entire length of said at least one wind turbine blade parts.

19. Method for manufacturing a wind turbine blade or a section of a wind turbine blade according to claim 1, wherein said at least one cavity is positioned in, or in close proximity of, said contact surfaces.

20. Method for manufacturing a wind turbine blade or a section of a wind turbine blade according to claim 1, wherein said pressure below atmospheric pressure provides a compressing force that runs uninterrupted throughout the longitudinal extent of said wind turbine blade parts.

21. Method for manufacturing a wind turbine blade or a section of a wind turbine blade according to claim 20, wherein said compressing force is uniform throughout the longitudinal extent of said wind turbine blade parts.

22. Method for manufacturing a wind turbine blade or a section of a wind turbine blade according to claim 1, wherein said method further comprises moulding said at least one first wind turbine blade part and said at least one second wind turbine blade part around at least one fixating edge on said at least one first fixating unit and said at least one second fixating unit.

23. Method for manufacturing a wind turbine blade or a section of a wind turbine blade according to claim 22, wherein said at least one fixating edge on said at least one first fixating unit or on said at least one second fixating unit is made in an acute angle and said at least one other fixating edge on said at least one first fixating unit or on said at least one second fixating unit is made substantially rectangular.

24. Method for manufacturing a wind turbine blade or a section of a wind turbine blade according to claim 1, wherein at least one of said at least one first fixating unit and said at least one second fixating unit is a mould, in which said at least one first and second wind turbine blade parts are molded.

25. A wind turbine blade comprising at least one first wind turbine blade part and at least one second wind turbine blade part, the wind turbine blade being manufactured in accordance with the method of claim 1.

* * * * *